(12) United States Patent
Burton et al.

(10) Patent No.: US 9,718,897 B1
(45) Date of Patent: Aug. 1, 2017

(54) PROCESS FOR THE POLYMERIZATION OR COPOLYMERIZATION OF AN ALPHA OLEFIN

(71) Applicant: LION COPOLYMER GEISMAR, LLC, Geismar, LA (US)

(72) Inventors: Willie Charles Burton, Geismar, LA (US); David G. Ward, Geismar, LA (US)

(73) Assignee: Lion Copolymer Geismar, LLC, Geismar, LA (US)

( * ) Notice: Subject to any disclaimer, the term of this patent is extended or adjusted under 35 U.S.C. 154(b) by 0 days.

(21) Appl. No.: 15/365,806

(22) Filed: Nov. 30, 2016

Related U.S. Application Data

(63) Continuation-in-part of application No. 15/247,630, filed on Aug. 25, 2016, which is a continuation-in-part of application No. 14/081,937, filed on Nov. 15, 2013, now abandoned.

(60) Provisional application No. 61/728,607, filed on Nov. 20, 2012.

(51) Int. Cl.
*C08F 2/06* (2006.01)
*C08F 10/14* (2006.01)
*C08F 4/6592* (2006.01)
*C08F 4/659* (2006.01)

(52) U.S. Cl.
CPC .............. *C08F 4/6592* (2013.01); *C08F 2/06* (2013.01); *C08F 4/65908* (2013.01); *C08F 4/65912* (2013.01); *C08F 10/14* (2013.01)

(58) Field of Classification Search
CPC .... C08F 2/06; C08F 4/65908; C08F 4/65912; C08F 4/6592; C08F 10/14
See application file for complete search history.

(56) References Cited

U.S. PATENT DOCUMENTS

| | | |
|---|---|---|
| 6,225,427 B1 | 5/2001 | Burton et al. |
| 6,696,379 B1 | 2/2004 | Carnahan et al. |
| 2005/0209417 A1 | 9/2005 | Marks et al. |

*Primary Examiner* — Caixia Lu
(74) *Attorney, Agent, or Firm* — Buskop Law Group, P.C.; Wendy Buskop

(57) ABSTRACT

A solution process for the polymerization or copolymerization of at least one alpha olefin can include adding a Lewis acid to an alkyl aluminum in a hexane or heptane to form a coordination complex, stirring the coordination complex continuously forming a near homogeneous solution in an inert anhydrous environment, adding at least one dry metallocene to the near homogenous solution forming a soluble polymerization initiator, then stirring to form a near homogenous metallocene enriched polymerization initiator, and polymerizing an alpha olefin with the metallocene enriched polymerization initiator and optionally adding additional alkyl aluminum as a moisture scavenger or an impurities scavenger to yield a poly alpha olefin. The at least one dry metallocene can have a transition metal compound. The Lewis acid is capable of forming an ion pair with the at least one dry metallocene.

13 Claims, No Drawings

PROCESS FOR THE POLYMERIZATION OR COPOLYMERIZATION OF AN ALPHA OLEFIN

CROSS REFERENCE TO RELATED APPLICATIONS

The present application is a Continuation in Part of co-pending U.S. patent application Ser. No. 15/247,630 filed on Aug. 25, 2016, entitled "PROCESS FOR THE POLYMERIZATION OF ALPHA OLEFINS AND NON-CONJUGATED DIENES USING A TOLUENE FREE HOMOGENOUS CO-CATALYST SYSTEM WITH METALLOCENE PRO-CATALYSTS", which is a Continuation in Part of U.S. patent application Ser. No. 14/081,937 filed on Nov. 15, 2013, entitled "PROCESS FOR THE POLYMERIZATION OF ALPHA OLEFINS AND NON-CONJUGATED DIENES USING A TOLUENE FREE HOMOGENOUS CO-CATALYST SYSTEM WITH METALLOCENE PRO-CATALYSTS", which claims priority to and the benefit of U.S. Provisional Patent Application Ser. No. 61/728,607 filed on Nov. 20, 2012, entitled "PROCESS FOR THE POLYMERIZATION OF ALPHA OLEFINS AND NON-CONJUGATED DIENES USING A TOLUENE FREE HOMOGENOUS CO-CATALYST SYSTEM WITH METALLOCENE PRO-CATALYSTS." These references are hereby incorporated in their entirety.

FIELD

The present embodiments generally relate to a process for the polymerization or copolymerization of at least one alpha olefin with unique combinations of properties, to obtain a poly alpha olefin employing a particular type of metallocene catalyst and/or Zeigler-Natta catalyst.

BACKGROUND

A need exists for an alpha olefin with a unique combination of properties, including Kinematic viscosity, weight average molecular weight, and polydispersity index.

The present embodiments meet these needs.

DETAILED DESCRIPTION OF THE EMBODIMENTS

Before explaining the present process in detail, it is to be understood that the process is not limited to the particular embodiments and that it can be practiced or carried out in various ways.

A benefit of the process is to save energy polymerizing alpha olefins by using a single solvent system instead of a multiple solvent system having a broad boiling range, or catalyst system that requires a catalyst support.

The embodiments contain a process that uses a "support free" catalyst; that is, the catalyst composition is not a supported catalyst composition. Hence the support material, such as a dehydrated inorganic oxide, is not required for use and then removed from the resulting polymerized alpha olefin.

The embodiments eliminate the use of multiple solvents in the polymerization process, making the single solvent easier to contain and reduce the possibility of fires at chemical plants.

The embodiments reduce emission of volatile organic components during processing and enable more effective control over a single solvent with known vaporization characteristics.

The embodiments prevent waste water pollution by eliminating the need for a supported catalyst in the polymerization process.

The embodiments reduce the chance of release of aromatics to the atmosphere.

The term "about" as used herein is intended to mean approximately, in the region of, roughly, or around. When the term "about" is used in conjunction with a numerical range, it modifies that range by extending the boundaries above and below the numerical values set forth. Unless otherwise indicated, it should be understood that the numerical parameters set forth in the following specification and attached claims are approximations. At the very least, and not as an attempt to limit the application of the doctrine of equivalents to the scope of the claims, numerical parameters should be read in light of the number of reported significant digits and the application of ordinary rounding techniques.

The term "activator" as used herein can refer to a reagent capable of reacting with another reagent to form a catalyst composition.

The term "alkyl aluminum" as used herein can refer to alkyl aluminum compounds, such as trialkylaluminum compounds that activate the metallocene or the Zeigler-Natta catalyst to advantageously remove polar impurities thus preventing deactivation of the catalyst during the polymerization process. Suitable alkyl aluminum compounds include triisobutylaluminum, trimethylaluminum, triethylaluminum, tri(n-propyl)aluminum, triisopropyl-aluminum, tri(n-butyl)(N-octyl) aluminum.

The term "alpha olefin" as used herein can refer to alpha olefins having from 8-20 carbon atoms and include specifically at least one of: 1-octene, 1-nonene, 1-decene, 1-dodecene, 1-tetradecene, 1-hexadecene, 1-octadecene, 1 eicosene, and 1 undecene.

The term "copolymerization" as used herein can refer to the process of the invention, by which two or more alpha olefins can be reacted in various ratios to form a final poly alpha olefin of various weight percent compositions.

The term "decene" as used herein can refer to an alkylene with the formula $C_{10}H_{20}$. Decene contains a chain of ten carbon atoms with one double bond, and this term includes all isomers. The molar mass is 140 g/mol, and a density of 0.74 g/cm3. The melting point is −66 degrees Celsius and the boiling point is 172 degrees Celsius.

The term "dry metallocene" as used herein can refer to one or a mixture of metallocene compounds in which the metallocene compound possesses a transition metal in the absence of moisture or solvent. The transition metal can be but is not limited to titanium, zirconium, hafnium, and the like.

The term "inert anhydrous environment" as used herein can refer to an environment for polymerization, which is in nitrogen or blanketed with another inert gas or combination of inert gasses.

The term "Kinematic viscosity" as used herein can refer to the polymer viscosity in centistokes (cSt) at 100 degrees Celsius.

The term "Lewis acid" as used herein can refer to a chemical species that reacts with a Lewis base to form a Lewis adduct. A Lewis base is any species that donates a pair of electrons to a Lewis acid to form a Lewis adduct. For example, OH and NH3 are Lewis bases, because they can donate a lone pair of electrons. In the adduct, the Lewis acid and base share an electron pair furnished by the Lewis base.

The term "kinematic viscosity" as used herein can refer to the Kinematic viscosity at 100 degrees Celsius ranging from 1 centistokes (cSt) to 50 centistokes (cSt)

The term "molecular weight distribution" or (MWD) as used herein can refer to the weight average molecular weight of a polymer (Mw) divided by the number average molecular weight of a polymer (Mn). Mw and Mn are determined as follows:

$$M_n = \frac{\sum_i N_i M_i}{\sum_i N_i}$$

and $$M_w = \frac{\sum_i N_i M_i^2}{\sum_i N_i M_i}$$

The term "near homogenous solution" as used herein can refer to a liquid or a solid phase containing more than one substance that is uniformly dispersed therein. The near homogenous solution can be a mixture of two or more components that have a uniform appearance and composition. The near homogenous solution is not a heterogeneous suspension which contains components made up of larger and less uniform particles. The near homogenous solution requires two different substances to be mixed together. Particles in the near homogenous solution are typically microscopic and <5 microns. Colloids are homogenous solutions with particles similar to size of those in heterogeneous suspensions.

The term "undecene" as used herein can refer to a 1-undecene, having a molecular weight from 150-160 g/mol, a density of 0.7 g/mL, a molar volume of 200-204 ML/mol, a refractive index of 1.4, a dielectric constant of 2.17 a melting point of −27 to −25 degrees Celsius, a boiling point of 190-200 degrees Celsius, and a molecular formula of $C_{11}H_{22}$. The term refers to isomers of the alpha olefins.

The poly alpha olefin polymerized by the homogenous polymerization catalyst does not use an alpha olefin selected from the group consisting of 2-butene, 2-pentene, 2-hexene, 3-hexene, 2-heptene, 3-heptene, 2-octene, 3-octene, 4-octene, and 5-decene.

The advantageous properties of the formed polymers can be incorporated into various viscosity modifiers, a rubber plasticizer, and lubricants.

This process specifically excludes the use of vulcanizing agents, accelerators, or extender oils.

The present embodiments also provide a method of preparing an olefinic polymer comprising the step of polymerizing olefinic monomers in the presence of the catalyst composition without a catalyst support.

In embodiments, a specific example of the olefinic monomer can be 1-heptene, 1-octene, 1-decene, 1-undecene, 1-dodecene, 1-tetradecene, 1-hexadecene, 1-octadecene, 1-eicosene, 1-undecene and the like; also two or more monomers can be copolymerized among them by mixture. The alpha olefin can have from 8 carbon atoms to 20 carbon atoms.

In embodiments, the molecular weight distribution (Mw/Mn) of the olefinic polymer can be but is not limited to preferably two or more.

In embodiments, the weight average molecular weight (Mw) of the olefinic polymer can be from about 250 to about 20,000, and can be from about 250 to about 12,000; however, the weight average molecular weight (Mw) is not limited to this.

The density of the polymerized olefinic polymer is from 0.82 g/cm³ to about 0.95 g/cm³

Therefore, the formed olefinic polymer according to the present embodiments is superior in thermal resistance, viscosity, processibility, and the like, and thus the olefinic polymer can be applied variously according to its use.

Example 1

Combine 0.018 grams of tris-pentafluorophenyl borane (Lewis acid (B)) and 1.9 mL of 1.5 molar modified methyl aluminoxane (MMAO) (alkyl aluminum (C)) in isohexane (D) to a 50 ml reaction flask. Then, dilute to 5 mL with dry isohexanes, yielding a coordination complex.

The coordination complex is then stirred continuously at room temperature, for 60 minutes under an oxygen free inert anhydrous environment yielding a near homogenous solution.

Add 0.01 grams (0.0231 mmole) of a dry metallocene compound known as isopropylidene(cyclopentadienyl 9-fluorenyl) zirconium dichloride to the near homogeneous solution and stir to form an aliphatic hydrocarbon soluble polymerization initiator.

The dry metallocene is in a molar ratio 1:1.5 with the Lewis acid and a molar ratio of 1:123 with the alkyl aluminum. Then, stir to form a near homogenous metallocene enriched polymerization initiator for 60 minutes.

An alpha olefin of 1-decene is polymerized with the metallocene enriched polymerization initiator by adding 1.0 mL of the near homogeneous metallocene enriched polymerization initiator to a stirred batch reactor containing 1800 mL (1200 grams) of dry hexane at 60 degrees Celsius and 200 grams of dry 1-decene and 2.5 mL of 1.0 Molar triisobutyl aluminum as a moisture and impurities scavenger to yield a 1-decene based poly alpha olefin with a Kinematic viscosity at 100 degrees Celsius of 400 cSt. It is expected that the final polymerized alpha olefin has a molecular weight range of 3000-4000.

Example 2

Combine 0.018 grams of tris-pentafluorophenyl borane (Lewis acid (B)) and 1.9 mL of 1.5 molar modified methyl aluminoxane (MMAO) (alkyl aluminum (C)) in isohexane (D) to a 50 ml reaction flask. Then, dilute to 5 mL with dry isohexanes, yielding a coordination complex.

The coordination complex is then stirred continuously at room temperature, for 60 minutes under an oxygen free inert anhydrous environment yielding a near homogenous solution.

Add 0.01 grams (0.0231 mmole) of a dry metallocene compound known as isopropylidene(cyclopentadienyl 9-fluorenyl) zirconium dichloride to the near homogeneous solution and stir to form an aliphatic hydrocarbon soluble polymerization initiator.

The dry metallocene is in a molar ratio 1:1.5 with the Lewis acid and a molar ratio of 1:123 with the alkyl aluminum. Then, stir to form a near homogenous metallocene enriched polymerization initiator.

An alpha olefin of 1-decene is polymerized with the metallocene enriched polymerization initiator by adding 1.0 mL of the near homogeneous metallocene enriched polymerization initiator to a stirred batch reactor containing 1800 mL of dry hexane at 60 degrees Celsius and 200 grams of dry 1-decene and 2.5 mL of 1.0 Molar triisobutyl aluminum as a moisture and impurities scavenger to yield a 1-decene based poly alpha olefin with a Kinematic viscosity at 100 degrees Celsius of 380 cSt. It is expected that the final polymerized alpha olefin has a molecular weight range of 3000-4000.

Example 3

Combine 0.018 grams of tris-pentafluorophenyl borane (Lewis acid (B)) and 1.9 mL of 1.5 molar modified methyl aluminoxane (MMAO) (alkyl aluminum (C)) in isohexane (D) to a 50 ml reaction flask. Then, dilute to 5 mL with dry isohexanes, yielding a coordination complex.

The coordination complex is then stirred continuously at room temperature, for 10 minutes under an oxygen free inert anhydrous environment yielding a near homogenous solution.

Add 0.01 grams (0.0231 mmole) of a dry metallocene compound known as rac-ethylenebis(indenyl) zirconium dichloride to the near homogeneous solution and stir for 60 minutes to form an aliphatic hydrocarbon soluble polymerization initiator.

The dry metallocene is in a molar ratio 1:1.5 with the Lewis acid and a molar ratio of 1:123 with the alkyl aluminum. Then, stir to form a near homogenous metallocene enriched polymerization initiator.

An alpha olefin of 1-decene is polymerized with the metallocene enriched polymerization initiator by adding 1.0 mL of the near homogeneous metallocene enriched polymerization initiator to a stirred batch reactor containing 1800 mL of dry hexane at 60 degrees Celsius and 200 grams of dry 1-decene and 2.5 mL of 1.0 Molar triisobutyl aluminum as a moisture and impurities scavenger to yield a 1-decene based poly alpha olefin with a Kinematic viscosity at 100 degrees Celsius of 250 cSt. It is expected that the final polymerized alpha olefin has a molecular weight range of 2500-3000.

Example 4

An alpha olefin of 1-decene is polymerized with the metallocene enriched polymerization initiator prepared in Example 3 by adding 1.0 mL of the near homogeneous metallocene enriched polymerization initiator to a stirred batch reactor containing 200 grams of dry 1-decene at 60 degrees Celsius and 2.5 mL of 1.0 Molar triisobutyl aluminum as a moisture and impurities scavenger to yield a 1-decene based poly alpha olefin with a Kinematic viscosity at 100 degrees Celsius of 250 cSt. It is expected that the final polymerized alpha olefin has a molecular weight range of 2500-3000.

Example 5

An alpha olefin of 1-decene is polymerized with the metallocene enriched polymerization initiator prepared in Example 3 by adding 1.0 mL of the near homogeneous metallocene enriched polymerization initiator to a stirred batch reactor containing 200 grams of dry 1-decene at 110 degrees Celsius and 2.5 mL of 1.0 Molar triisobutyl aluminum as a moisture and impurities scavenger to yield a 1-decene based poly alpha olefin with a Kinematic viscosity at 100 degrees Celsius of 25 cSt. It is expected that the final polymerized alpha olefin has a molecular weight range of 500-700.

Example 6

An alpha olefin of 1-decene is polymerized with the metallocene enriched polymerization initiator prepared in Example 3 by adding 1.0 mL of the near homogeneous metallocene enriched polymerization initiator to a stirred batch reactor containing 200 grams of dry 1-decene at 60 degrees Celsius and pressurized with dry nitrogen to 200 psig and 2.5 mL of 1.0 Molar triisobutyl aluminum as a moisture and impurities scavenger to yield a 1-decene based poly alpha olefin with a Kinematic viscosity at 100 degrees Celsius of 270 cSt. It is expected that the final polymerized alpha olefin has a molecular weight range of 2500-3000.

Example 7

Combine 0.018 grams of tris-pentafluorophenyl borane (Lewis acid (B)) and 1.9 mL of 1.5 molar modified methyl aluminoxane (MMAO) (alkyl aluminum (C)) in isohexane (D) to a 50 ml reaction flask. Then, dilute to 5 mL with dry isohexanes, yielding a coordination complex.

The coordination complex is then stirred continuously at room temperature, for 10 minutes under an oxygen free inert anhydrous environment yielding a near homogenous solution.

Add 0.01 grams (0.0231 mmole) of a dry metallocene compound known as rac-dimethylsilylbis(tetrahydro indenyl) zirconium dichloride to the near homogeneous solution and stir for 30 minutes to form an aliphatic hydrocarbon soluble polymerization initiator.

The dry metallocene is in a molar ratio 1:1.65 with the Lewis acid and a molar ratio of 1:130 of dry metallocene with the alkyl aluminum. Then, stir for 10 minutes to form a near homogenous metallocene enriched polymerization initiator.

An alpha olefin of 1-decene is polymerized with the metallocene enriched polymerization initiator by adding 1.0 mL of the near homogeneous metallocene enriched polymerization initiator to a stirred batch reactor containing 200 grams of dry 1-decene at 80 degrees Celsius pressurized to 40 psig with dry nitrogen and 1.0 mL of 1.0 Molar triisobutyl aluminum as a moisture and impurities scavenger to yield a 1-decene based poly alpha olefin with a Kinematic viscosity at 100 degrees Celsius of 87 cSt. It is expected that the final polymerized alpha olefin has a molecular weight range of 500-1000.

Example 8

An alpha olefin of 1-decene is polymerized with the metallocene enriched polymerization initiator prepared in Example 7 by adding 1.0 mL of the near homogeneous metallocene enriched polymerization initiator to a stirred batch reactor containing 200 grams of dry 1-decene at 80 degrees Celsius pressurized to 10 psig with dry hydrogen followed by pressurization to 40 psig with dry nitrogen and 1.0 mL of 1.0 Molar triisobutyl aluminum as a moisture and impurities scavenger to yield a 1-decene based poly alpha olefin with a Kinematic viscosity at 100 degrees Celsius of 40 cSt. It is expected that the final polymerized alpha olefin has a molecular weight range of 250-400.

Example 9

An alpha olefin of 1-decene is polymerized with the metallocene enriched polymerization initiator prepared in Example 7 by adding 1.0 mL of the near homogeneous metallocene enriched polymerization initiator to a stirred batch reactor containing 200 grams of dry 1-decene at 80 degrees Celsius pressurized to 20 psig with dry hydrogen followed by pressurization to 40 psig with dry nitrogen and 1.0 mL of 1.0 Molar triisobutyl aluminum as a moisture and impurities scavenger to yield a 1-decene based poly alpha olefin with a Kinematic viscosity at 100 degrees Celsius of 10 cSt. It is expected that the final polymerized alpha olefin has a molecular weight range of 250-300.

Example 10

An alpha olefin of 1-octene is polymerized with the metallocene enriched polymerization initiator prepared in Example 7 by adding 1.0 mL of the near homogeneous metallocene enriched polymerization initiator to a stirred batch reactor containing 200 grams of dry 1-octene at 80 degrees Celsius pressurized to 40 psig with dry nitrogen and 1.0 mL of 1.0 Molar triisobutyl aluminum as a moisture and impurities scavenger to yield a 1-octene based poly alpha olefin with a Kinematic viscosity at 100 degrees Celsius of 70 cSt. It is expected that the final polymerized alpha olefin has a molecular weight range of 500-1000.

In embodiments, the molar ratio of the dry metallocene to Lewis acid can be: a molar ratio 1:1 with the Lewis acid, a molar ratio of 1:2 with the Lewis acid, a molar ratio of 1:3 with the Lewis acid and all the numbers in between.

In embodiments, the molar ratio of the dry metallocene to alkyl aluminum can be: a molar ratio 1:15 with the alkyl aluminum, a molar ratio of 1:100 with the alkyl aluminum, a molar ratio of 1:500 with the alkyl aluminum and all the numbers in between.

In embodiments, the molecular weight of the polymerized alpha olefin can be 5000, 10,000, 20,000 and all the numbers in between using the metallocene enriched polymerization initiator.

In embodiments, the amount of hexane or heptane in the final polymerized alpha olefin is from 100 to 100,000 parts by mass based on 1 part by mass of the Lewis acid.

In embodiments, the stirring to form the near homogenous solution can be from 2 minutes to 60 minutes.

In embodiments, the stirring to form the near homogenous metallocene enriched polymerization initiator can be from 2 minutes to 60 minutes.

The temperature of polymerization can be maintained in a range from 40 degrees Celsius to 120 degrees Celsius.

In embodiments, the pressure for the polymerization can maintained from 2 psig to 200 psig.

Example 11—Ziegler Natta Catalyst Preparation (Example without Metallocene)

Combine 2 ml of 0.05 molar vanadium oxytrichloride and 1.4 ml of 0.5 molar dichlorophenyl acetic acid ethyl ester to a 50 ml flask. Then dilute solution to 5.0 ml with dry isohexane. This diluted solution is stirred for 1-2 minutes to form a homogenous solution.

An alpha olefin of 1-decene is polymerized with the Ziegler Natta catalyst prepared as described above by adding 0.2 mL of the prepared Zeigler Natta catalyst solution to a 50 mL stirred reaction vessel containing 15 grams of dry 1-decene at 80 degrees Celsius pressurized to 2 psig with dry nitrogen and 0.2 mL of 1.0 Molar ethylaluminum sesquichloride as a moisture and impurities scavenger, to yield a 1-decene based poly alpha olefin with a weight average molecular weight of 20,000 Daltons as determined using Gel Permeation Chromatography.

Example 12—Ziegler Natta and Metallocene Example

A Ziegler Natta catalyst is formed as described in Example 11.

Metallocene is added to the Ziegler Natta Catalyst in a molar ratio of Zeigler Natta to metallocene of 0.1:1.

0.2 ml of the combination of metallocene and Ziegler Natta catalyst are added to a 50 ml stirred reaction vessel containing 15 grams of dry 1-decene at 80 degrees Celsius pressurized to 2 psig with dry nitrogen with 0.2 ml of 1.0 Molar triisobutyl aluminum as a moisture and impurities scavenger to yield a 1-decene based poly alpha olefin with a weight average molecular weight of 30,000 Daltons as determined Gel Permeation Chromatography with a Kinematic viscosity at 100 degrees Celsius of 1000 cSt. It is expected that the final polymerized alpha olefin has a molecular weight range of 5000-20000.

Example 13—Ziegler Natta and Metallocene Example

A Ziegler Natta catalyst is formed as described in Example 11.

Metallocene is added to the Ziegler Natta Catalyst in a molar ratio of Zeigler Natta to metallocene of 1:1.

0.2 ml of the combination of metallocene and Ziegler Natta catalyst are added to a 50 ml stirred reaction vessel containing 15 grams of dry 1-decene at 80 degrees Celsius pressurized to 2 psig with dry nitrogen with 0.2 ml of 1.0 Molar triisobutyl aluminum as a moisture and impurities scavenger to yield a 1-decene based poly alpha olefin with a weight average molecular weight of 30,000 Daltons as determined Gel Permeation Chromatography with a Kinematic viscosity at 100 degrees Celsius of 500 cSt. It is expected that the final polymerized alpha olefin has a molecular weight range of 5000-20000.

In embodiments, a homogenous polymerization catalyst for polymerization or copolymerization of at least one alpha olefin can have a Lewis acid (B), an alkyl aluminum (C) in a hexane or heptane (D), and at least one dry metallocene (A); wherein the dry metallocene is in a molar ratio from 1:1.5 to 1:3 with the Lewis acid and a molar ratio from 1:15 to 1:500 of the dry metallocene to the alkyl aluminum.

The dry metallocene (A) can have a transition metal compound.

In embodiments, the Lewis acid (B) is capable of forming an ion pair with the dry metallocene (A). The amount of the Lewis acid (B) and the alkyl aluminum (C) can be 1 mol to 3.0 mol and 15.0 mol to 500.0 mol, respectively, based on 1 mol of the dry metallocene (A), and the amount of the hexane or heptane (D) is 100 to 100,000 parts by mass, based on 1 part by mass of the Lewis acid (B) for producing a poly alpha olefin from alpha olefin monomers or mixed alpha olefins, wherein a produced poly alpha olefin has a kinematic viscosity at 100 degrees Celsius ranging from 1 to 1000 cSt.

The alpha olefin for polymerization can be from 8 to 20 carbon atoms.

In embodiments, a Zeigler-Natta catalyst can be blended with the dry metallocene in a molar ratio of Zeigler-Natta to metallocene from 0.1:1 to 1:1.

The dry metallocene (A) is a metallocene complex comprising a non-cross-linked ligand, or a metallocene complex comprising cross-linked ligand.

The dry metallocene (A) can be a non-cross-linked ligand selected from the group consisting of biscyclopentadienylzirconium dichloride, bis(n-butylcyclopentadienyl)zirconium dichloride, bis(pentamethylcyclopentadienyl)zirconium dichloride, bisindenylzirconium dichloride, and bis(tetramethylcyclopentadienyl)zirconium dichloride.

The dry metallocene (A) can be a cross-linked ligand selected from the group consisting of dimethylsilylene(tetramethylcyclopentadienyl)(3-tert-butyl-5-methyl-2-phenoxy)zirconium dichloride, dimethylsilylene(tetramethylcyclopentadienyl)(tert-butylamido)zirconium dichloride, dimethylsilylenebis(2-methyl-4,5-benzoindenyl)zirconium dichloride, dimethylsilylenebis(2-methyl-4-phenylindenyl)zirconium dichloride, dimethylsilylenebis(2-methyl-4-naphthylindenyl)zirconium dichloride, dimethylsilylenebis(2-methylindenyl)zirconium dichloride, ethylenebis(2-methylindenyl)zirconium dichloride, and ethylenebisindenylzirconium dichloride.

The coordination complex compound is selected from the group consisting of triethylammonium tetraphenylborate, tri(n-butyl)ammonium tetraphenylborate, trimethylammonium tetraphenylborate, triethylammonium tetrakis(pentafluorophenyl)borate, tri(n-butyl)ammonium tetrakis(pentafluorophenyl)borate, triethylammonium hexafluoroarsenate, pyridinium tetrakis(pentafluorophenyl)borate, pyrrolinium tetrakis(pentafluorophenyl)borate, N,N-dimethylanilinium tetrakis(pentafluorophenyl)borate, and methyldiphenylammonium tetrakis(pentafluorophenyl)borate.

The coordination complex compound is selected from the group consisting of ferrocenium tetraphenylborate, dimethylferrocenium tetrakis(pentafluorophenyl)borate, ferrocenium tetrakis(pentafluorophenyl)borate, decamethylferrocenium tetrakis(pentafluorophenyl)borate, acetylferrocenium tetrakis(pentafluorophenyl)borate, formylferrocenium tetrakis(pentafluorophenyl)borate, cyanoferrocenium tetrakis(pentafluorophenyl)borate, silver tetraphenylborate, silver tetrakis(pentafluorophenyl)borate, trityl tetraphenylborate, trityl tetrakis(pentafluorophenyl)borate, and silver tetrafluoroborate.

The alkyl aluminum (C) can be selected from the group consisting of trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminum sesquichloride.

The alkyl aluminum (C) can be selected from the group consisting of tetramethyldialumoxane, tetraisobutyldialumoxane, methylalumoxane, ethylalumoxane, butylalumoxane, and isobutylalumoxane.

While these embodiments have been described with emphasis on the embodiments, it should be understood that within the scope of the appended claims, the embodiments might be practiced other than as specifically described herein.

What is claimed is:

1. A solution process for the polymerization or copolymerization of at least one alpha olefin comprising:
   a. adding a coordination complex (B) selected from the group consisting of triethylammonium tetraphenylborate, tri(n-butyl)ammonium tetraphenylborate, trimethylammonium tetraphenylborate, triethylammonium tetrakis(pentafluorophenyl)borate, tri(n-butyl)ammonium tetrakis(pentafluorophenyl)borate, triethylammonium hexafluoroarsenate, pyridinium tetrakis(pentafluorophenyl)borate, pyrrolinium tetrakis(pentafluorophenyl)borate, N,N-dimethylanilinium tetrakis(pentafluorophenyl)borate, and methyldiphenylammonium tetrakis(pentafluorophenyl)borate and ferrocenium tetraphenylborate, dimethylferrocenium tetrakis(pentafluorophenyl)borate, ferrocenium tetrakis(pentafluorophenyl)borate, decamethylferrocenium tetrakis(pentafluorophenyl)borate, acetylferrocenium tetrakis(pentafluorophenyl)borate, formylferrocenium tetrakis(pentafluorophenyl)borate, cyanoferrocenium tetrakis(pentafluorophenyl)borate, silver tetraphenylborate, silver tetrakis(pentafluorophenyl)borate, trityl tetraphenylborate, trityl tetrakis(pentafluorophenyl)borate, and silver tetrafluoroborate to an alkyl aluminum (C) in hexane or heptane (D) to form a mixture;
   b. stirring the mixture continuously forming a homogeneous solution in an inert anhydrous environment;
   c. adding at least one dry metallocene (A) to the homogenous solution of the coordination complex and alkyl aluminum (C) forming a metallocene catalyst solution, wherein the mole ratio of the metallocene to the coordination complex is from 1:1.5 to 1:3 and the mole ratio of the metallocene to the alkyl aluminum is from 1:15 to 1:500 to form a homogenous metallocene enriched catalyst solution; and
   d. polymerizing an alpha olefin with the homogeneous metallocene enriched catalyst solution and optionally adding additional alkyl aluminum as a moisture scavenger or an impurities scavenger to yield a polyalphaolefin with a molecular weight from 250 to 20,000 and a kinematic viscosity at 100 degrees Celsius ranging from 1 cSt to 1000 cSt wherein the metallocene is capable of forming an ion pair with coordination complex (B), and wherein the amounts of coordination complex (B) and alkyl aluminum (C) are 1 mol to 3.0 mol and 15.0 mol to 500 mol, respectively, based on 1 mol of metallocene (A), and the amount of hexane or heptane (D) is 100 parts by mass to 100,000 parts by mass, based on 1 part by mass of the coordination complex.

2. The process of claim 1, wherein the stirring is from 2 minutes to 60 minutes to form the homogeneous solution.

3. The process of claim 1, wherein the stirring is from 2 minutes to 60 minutes to form the homogeneous metallocene enriched catalyst solution.

4. The process of claim 1, wherein the alpha olefin has from 8 carbon atoms to 20 carbon atoms.

5. The process of claim 4, wherein the alpha olefin is selected from the group consisting of: 1-octene, 1-nonene, 1-decene, 1-dodecene, 1-tetradecene, 1-hexadecene, 1-octadecene, 1-eicosene, and 1-undecene.

6. The process of claim 1, wherein a temperature of polymerization is maintained in a range from 40 degrees Celsius to 120 degrees Celsius.

7. The process of claim 1, wherein a pressure for the polymerization is maintained from 2 psig to 200 psig.

8. The process of claim 1, comprising a Zeigler-Natta catalyst blended with the homogenous catalyst solution in a molar ratio of vanadium of the Zeigler-Natty catalyst to metallocene from 0.1:1 to 1:1.

9. The process of claim 1, wherein the metallocene is a metallocene complex comprising a bridged or unbridged metallocene complex.

10. The process of claim 9, wherein the metallocene complex comprising an unbridged metallocene complex selected from the group consisting of: biscyclopentadienylzirconium dichloride, bis(n-butylcyclopentadienyl)zirconium dichloride, bis(pentamethylcyclopentadienyl)zirconium dichloride, bisindenylzirconium dichloride, and bis(tetramethylcyclopentadienyl)zirconium dichloride.

11. The process of claim 9, wherein the metallocene complex comprising the bridged metallocene complex is selected from the group consisting of: dimethylsilylene (tetramethylcyclopentadienyl)(3-tert-butyl-5-methyl-2-phenoxy)zirconium dichloride, dimethylsilylene(tetramethylcyclopentadienyl)(tert-butylamido)zirconium dichloride, dimethylsilylenebis(2-methyl-4,5-benzoindenyl)zirconium dichloride, dimethylsilylenebis(2-methyl-4-phenylindenyl)zirconium dichloride, dimethylsilylenebis(2-methyl-4-naphthylindenyl1)zirconium dichloride, dimethylsilylenebis(2-methylindenyl)zirconium dichloride, ethylenebis(2-methylindenyl)zirconium dichloride, and ethylenebisindenylzirconium dichloride.

12. The process of claim 1, wherein the alkyl aluminum is selected from the group consisting of: trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminum sesquichloride.

13. The process of claim 1, wherein the alkyl aluminum is selected from the group consisting of: tetramethyldialuminoxane, tetraisobutyldialuminoxane, methylaluminoxane, ethylalumin oxane, butylaluminoxane, and isobutylaluminoxane.

* * * * *